United States Patent
Oomura (10) Patent No.: US 8,174,219 B2
(45) Date of Patent: May 8, 2012

(54) MOTOR CONTROL UNIT AND AIR CONDITIONER HAVING THE SAME

(75) Inventor: Naoki Oomura, Shizuoka-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 463 days.

(21) Appl. No.: 12/490,496

(22) Filed: Jun. 24, 2009

(65) Prior Publication Data

US 2009/0315492 A1   Dec. 24, 2009

(30) Foreign Application Priority Data

Jun. 24, 2008  (JP) ................. P2008-164427

(51) Int. Cl.
 *H02P 21/00* (2006.01)
(52) U.S. Cl. ............... 318/400.02; 318/400.11; 318/779
(58) Field of Classification Search ............. 318/400.02, 318/400.11, 779, 400.32, 800, 812, 434, 318/432
See application file for complete search history.

(56) References Cited

U.S. PATENT DOCUMENTS

2009/0251083 A1* 10/2009 Kinpara et al. .......... 318/400.11

FOREIGN PATENT DOCUMENTS

| JP | 2006-129663 | 5/2006 |
|---|---|---|
| JP | 2007-181352 | 7/2007 |

* cited by examiner

*Primary Examiner* — Karen Masih
(74) *Attorney, Agent, or Firm* — Finnegan, Henderson, Farabow, Garrett & Dunner, L.L.P.

(57) ABSTRACT

A motor control unit or a semiconductor integrated circuit device for an air conditioner is provided. The motor control unit includes a current detector that detects a coil wound current of the permanent magnet motor; a coordinate transformer that transforms the coil wound current detected by the current detector into a d-axis current indicating a magnet flux component and a q-axis current indicating a torque component perpendicular to the magnet flux component; a position estimator that estimates a rotational position of the rotor based on an induced voltage of the permanent magnet motor; a current controller that calculates a command d-axis voltage based on a command d-axis current and the d-axis current detected by the current detector, and that calculates a command q-axis voltage based on a command q-axis current and the q-axis current detected by the current detector; an electrifier controller that electrifies the coil wound based on the command d-axis voltage and the command q-axis voltage; and a start-up controller that detects an oscillation of the rotor during a start-up operation and, if a velocity direction of the oscillation corresponds with a rotational direction of a forcible commutation, the start-up controller starts the forcible commutation so as to start an acceleration of the rotor by following an acceleration pattern.

8 Claims, 6 Drawing Sheets

MOTOR CONTROL UNIT AND AIR CONDITIONER HAVING THE SAME

CROSS REFERENCE TO THE RELATED APPLICATION

This application is based upon and claims the benefit of priority from Japanese Patent Application No. 2008-164427, filed on Jun. 24, 2008, the entire contents of which are incorporated herein by reference.

FIELD OF THE INVENTION

The present invention relates to a motor control unit that starts and drives a permanent magnet motor based on sensor-less automation control. The invention also relates an air conditioner having the motor control unit.

BACKGROUND

A permanent magnet motor having a rotor with permanent magnets has been used as home appliances, industrial machines, automotive machines and information machines because of its high efficiency. The permanent magnet motor has been used as a motor driving a compressor and a fan of a heat exchanger and so on. A motor control unit executes vector control to divide a current into a d-axis component indicating a magnetic flux component and a q-axis component indicating a torque component perpendicular to the d-axis component and to control the d-axis component and the q-axis component respectively.

The motor control unit executes sensor-less control to detect a rotational position of the rotor of the permanent magnet motor when the permanent magnet motor is used in a heat environment or a high pressure environment in order to secure high efficiency. JP 2007-181352A discloses a motor control unit that estimates a rotational position based on the d-axis current, the q-axis current and the d-axis voltage, or the d-axis current, the q-axis current, the d-axis voltage and the q-axis voltage.

This motor control unit estimates the rotational position based on an induced voltage generated by rotating the permanent magnet motor. JP 2006-129663A discloses a motor control unit that rotates a permanent magnet motor by increasing the d-axis current from zero and maintaining the q-axis current at zero and then starts a forcible commutation during a start-up operation without generating an induced voltage.

There is a problem that start-up time becomes long because it takes long time for an oscillation of the rotor to converge and for the rotor to stop at a proper position, and for the motor control unit to start a forcible commutation if a moment of inertia is large such as the case for a fan motor of a heat exchanger of an air conditioner. To avoid this problem, the forcible commutation may be started before the oscillation of the rotor converges. However, this often results in a start-up failure.

SUMMARY

Accordingly, an advantage of an aspect of the present invention is to provide a motor control unit that is capable of starting a permanent magnet motor surely in shot time even if the moment of inertia of the permanent magnet motor is large.

To achieve the above advantage, one aspect of the present invention is to provide a motor control unit for controlling a permanent magnet motor having a rotor provided with a permanent magnet that includes a current detector that detects a coil wound current of the permanent magnet motor; a coordinate transformer that transforms the coil wound current detected by the current detector into a d-axis current indicating a magnet flux component and a q-axis current indicating a torque component perpendicular to the magnet flux component; a position estimator that estimates a rotational position of the rotor based on an induced voltage of the permanent magnet motor; a current controller that calculates a command d-axis voltage based on a command d-axis current and the d-axis current detected by the current detector, and that calculates a command q-axis voltage based on a command q-axis current and the q-axis current detected by the current detector; an electrifier controller that electrifies the coil wound based on the command d-axis voltage and the command q-axis voltage; and a start-up controller that detects an oscillation of the rotor during a start-up operation and, if a velocity direction of the oscillation corresponds with a rotational direction of a forcible commutation, the start-up controller starts the forcible commutation so as to start an acceleration of the rotor by following an acceleration pattern.

BRIEF DESCRIPTION OF THE DRAWINGS

Other object and features of the invention will become apparent to those skilled in the art as the disclosure is made in the following description of embodiment of the invention, as illustrated in the accompanying sheet of drawings, in which.

DETAILED DESCRIPTION OF EMBODIMENTS

The first embodiment in accordance with the invention will be described with reference to FIGS. 1 to 5. FIG. 2 illustrates a configuration of a refrigeration cycle of an air conditioner. As shown in FIG. 2, a heat pump HP of the air conditioner 1 has a compressor 2, a four-direction valve 3, an interior heat exchanger 4, a decompressor 5 and an exterior heat exchanger 6. These are airtightly connected through piping 7. The compressor 2 has a compression part 8 and a motor 9 in an airtight container 10. The motor 9 may be, for example, a three-phase magnet motor.

In case of heating a room, the four-direction valve 3 switches to the state indicated by the solid line in FIG. 2. A medium in the piping 7 is compressed by the compression part 8 in the compressor 2. The compressed medium enters the interior heat exchanger 4 through the four-direction valve 3 and condenses. The condensing medium enters the decompressor 5 and decompresses. The decompressed medium returns to the compressor 2 through the exterior heat exchanger 6.

In case of cooling a room, the four-direction valve 3 switches to the state indicated by the broken line in FIG. 2. A medium in the piping 7 is compressed by the compression part 8 in the compressor 2. The compressed medium enters the exterior heat exchanger 6 through the four-direction valve 3 and condenses. The condensing medium enters the decompressor 5 and decompresses. The decompressed medium returns to the compressor 2 through the interior heat exchanger 4. A wind flow is sent in the interior heat exchanger 4 and the exterior heat exchanger 6 by fans 11, 12. A heat exchange between the interior heat exchanger 4 and interior air and between the exterior heat exchanger 6 and exterior air are performed efficiently by the wind. The fan 12 in the exterior side is driven by a fan motor 13 constituted by a permanent magnet motor.

Figure 1:
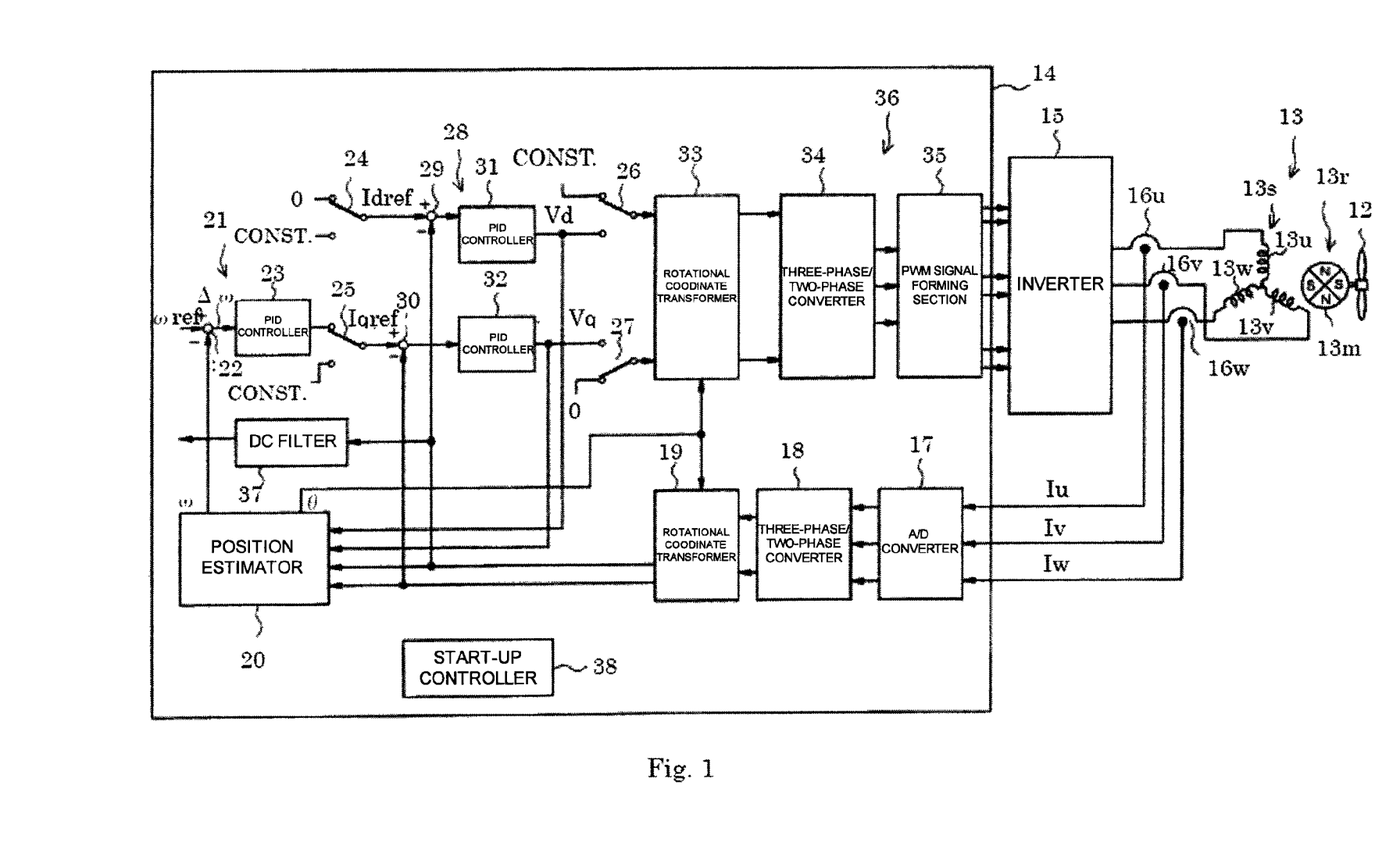
FIG. 1 illustrates the first embodiment of the present disclosure and indicates a block diagram of an electrical configuration of a motor control system.
Figure 2:
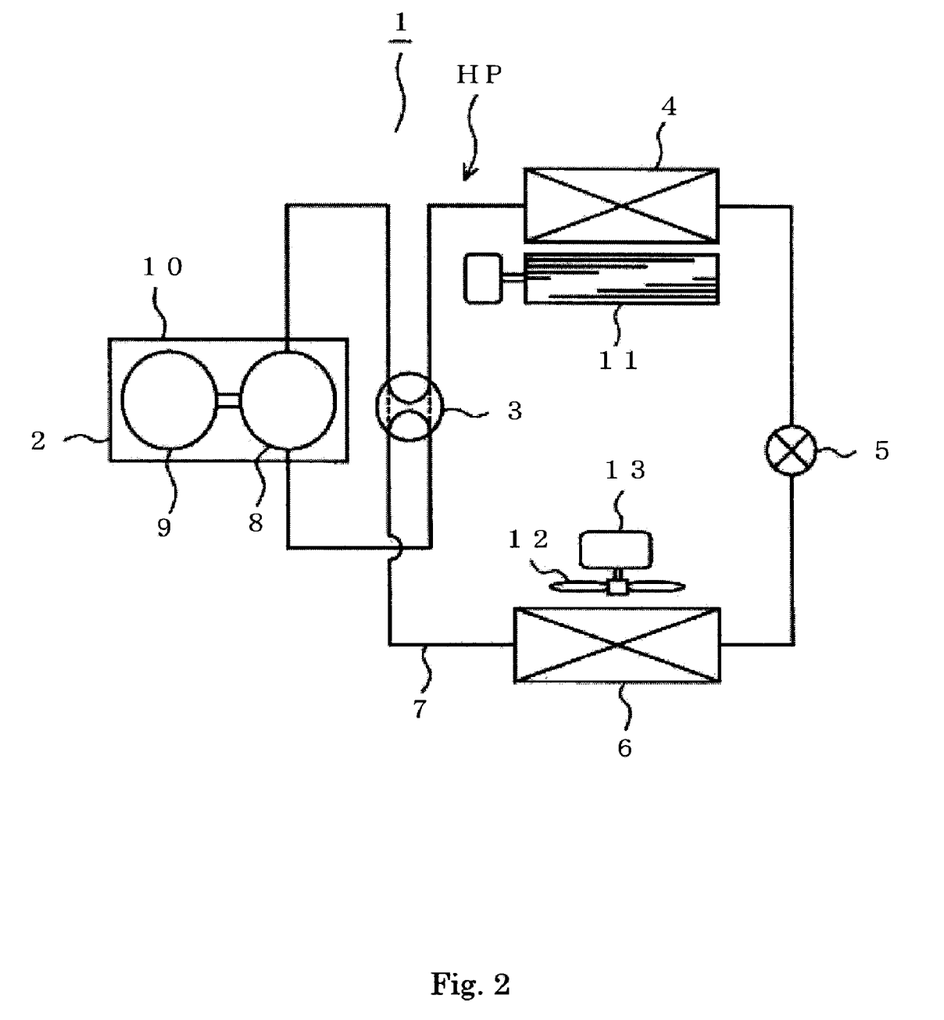
FIG. 2 illustrates a configuration of a refrigeration cycle of an air conditioner.

FIG. 1 is a first embodiment of the present disclosure and indicates a block diagram of an electrical configuration of a motor control system. Three-phase coil wounds 13u, 13v, 13w are wound on a stator of the fan motor 13. A permanent magnet 13m is installed on a rotor 13r of the fan motor 13. A motor control unit 14 drives the fan motor 13 through an inverter 15 by sensor-less vector control. The motor control unit 14 may be a semiconductor integrated circuit device. Specifically, the motor control unit 14 may have a processor that is capable of high speed calculation and reads a control program from a memory such as a flash memory and processes it. The motor control unit 14 may be an assembly of functional circuit devices without a processor.

The inverter 15 is a voltage type three-phase inverter having switching elements such as IGBT or FET configured to a three-phase bridge. Current detectors 16u, 16v, 16w constituted by hall CTs, shunt resistors or the like that detect an U-phase current Iu, a V-phase current Iv and a W-phase current Iw are provided between the inverter 15 and the fan motor 13. Also, it may be possible to omit one current detector of the three current detectors 16u, 16v, 16w.

Next, the motor control unit 14 will be described. As shown in FIG. 1, an analog-to-digital (A/D) converter 17 converts the currents Iu, Iv, Iw to proper digital signals. A three-phase/two-phase converter 18 converts the digital signals to two-phase currents Iα, Iβ. A rotational coordinate transformer 19 transforms the two-phase currents Iα, Iβ on the fixed coordinate to a d-axis current Id and a q-axis current Iq on the rotational coordinate.

A position estimator 20 obtains a d-axis induced voltage Ed (and a q-axis induced voltage Eq if needed) of the fan motor 13 based on a command voltage Vd (and a command voltage Vq if needed), the d-axis current Id and the q-axis current Iq. The position estimator 20 estimates a rotational position θ and a rotational velocity ω based on the induced voltage Ed. A nonvolatile memory (not shown) stores inductance Ld, Lq and resistance R of the coil wound of the fan motor 13.

Next, two different estimation examples executed by the position estimator 20 will be described.
(The First Estimation Example)

The position estimator 20 calculates equation (1) to obtain the d-axis induced voltage Ed generated in the coil wound by magnetic flux of the permanent magnet 13m. P of equation (1) denotes a differential operator.

$$Ed = Vd - R \cdot Id - Ld \cdot p \mid d + \omega \cdot Lq \cdot Iq \quad (1)$$

The position estimator 20 calculates equation (2) to estimate the rotational velocity ω by proportional integral operation of the d-axis induced voltage Ed. G1 and G2 of equation (2) denote gain constant values.

$$\omega = -G1 \cdot Ed - G2 \cdot \int Ed \cdot dt \quad (2)$$

The position estimator 20 calculates equation (3) to estimate the rotational position θ by integral operation of the rotational velocity ω.

$$\theta = \int \omega \cdot dt \quad (3)$$

(The Second Estimation Example)

The position estimator 20 calculates equations (4) and (5) to obtain the d-axis induced voltage Ed and the q-axis induced voltage Eq generated in the coil wound by magnetic flux of the permanent magnet 13m.

$$Ed = Vd - R \cdot Id - Ld \cdot pId + \omega \cdot Lq \cdot Iq \quad (4)$$

$$Eq = Vq - \omega \cdot Ld \cdot Id - R \cdot Iq - Lq \cdot pIq \quad (5)$$

The position estimator 20 calculates equation (6) to estimate the rotational velocity ω by proportional integral operation of the d-axis induced voltage Ed and the q-axis induced voltage.

$$\omega = G1 \cdot Eq - G2 \cdot Ed \quad (6)$$

The position estimator 20 calculates equation (3) to estimate the rotational position θ by integral operation of the rotational velocity ω.

A velocity controller 21 is configured by a subtractor 22 and a proportional-integral-differential (PID) controller 23. The subtractor 22 outputs a velocity deviation Δω by subtracting the estimated rotational velocity ω from a command rotational velocity ωref. The PID controller 23 outputs a command q-axis current Iqref by PID operation of the velocity deviation Δω.

Some switches 24, 25, 26, 27 switch during start-up control of the fan motor 13. The switches 24, 25 select a command d-axis current Idref and a command q-axis current Iqref which are inputted into a current controller 28. The switches 26 and 27 select a command d-axis voltage Vd and a command q-axis voltage Vq which are inputted into a rotational coordinate transformer 33.

The current controller 28 is configured with subtractors 29, 30, PID controller 31 and 32. The subtractor 29 outputs a d-axis current deviation ΔId by subtracting the d-axis current Id from the command d-axis current Idref. The PID controller 31 outputs a command d-axis voltage Vd by PID operation of the d-axis current deviation ΔId. The subtractor 30 outputs a q-axis current deviation ΔIq by subtracting the q-axis current Iq from the command q-axis current Iqref. The PID controller 32 outputs a command q-axis voltage Vq by PID operation of the q-axis current deviation ΔIq.

The rotational coordinate transformer 33 transforms the command d-axis voltage Vd and the command q-axis voltage Vq on the rotational coordinate to command voltages Vα and Vβ on the fixed coordinate based on the rotational position θ estimated by the rotational estimator 20. A three-phase/two-phase inverter 34 inverts the command voltages Vα, Vβ to three-phase command voltages Vu, Vv, Vw. A pulse-width-modulation (PWM) signal forming section 35 outputs PWM signal to the inverter 15 based on the three-phase command voltages Vu, Vv, Vw. Also six basic vectors and the two zero vectors may be chosen and the combination of the command voltages Vu, Vv, Vw may be determined effectually by the spatial vector method. The electrifier controller 36 is constituted by the rotational coordinate transformer 33, the three-phase/two-phase inverter 34 and the PWM signal forming section 35.

A direct current (DC) filter 37 outputs an alternating current component of the d-axis current Id by eliminating a direct current component. A start-up controller 38 puts a fan motor 13 into operation, changing the switches 24, 25, 26, 27 properly.

Figure 3:
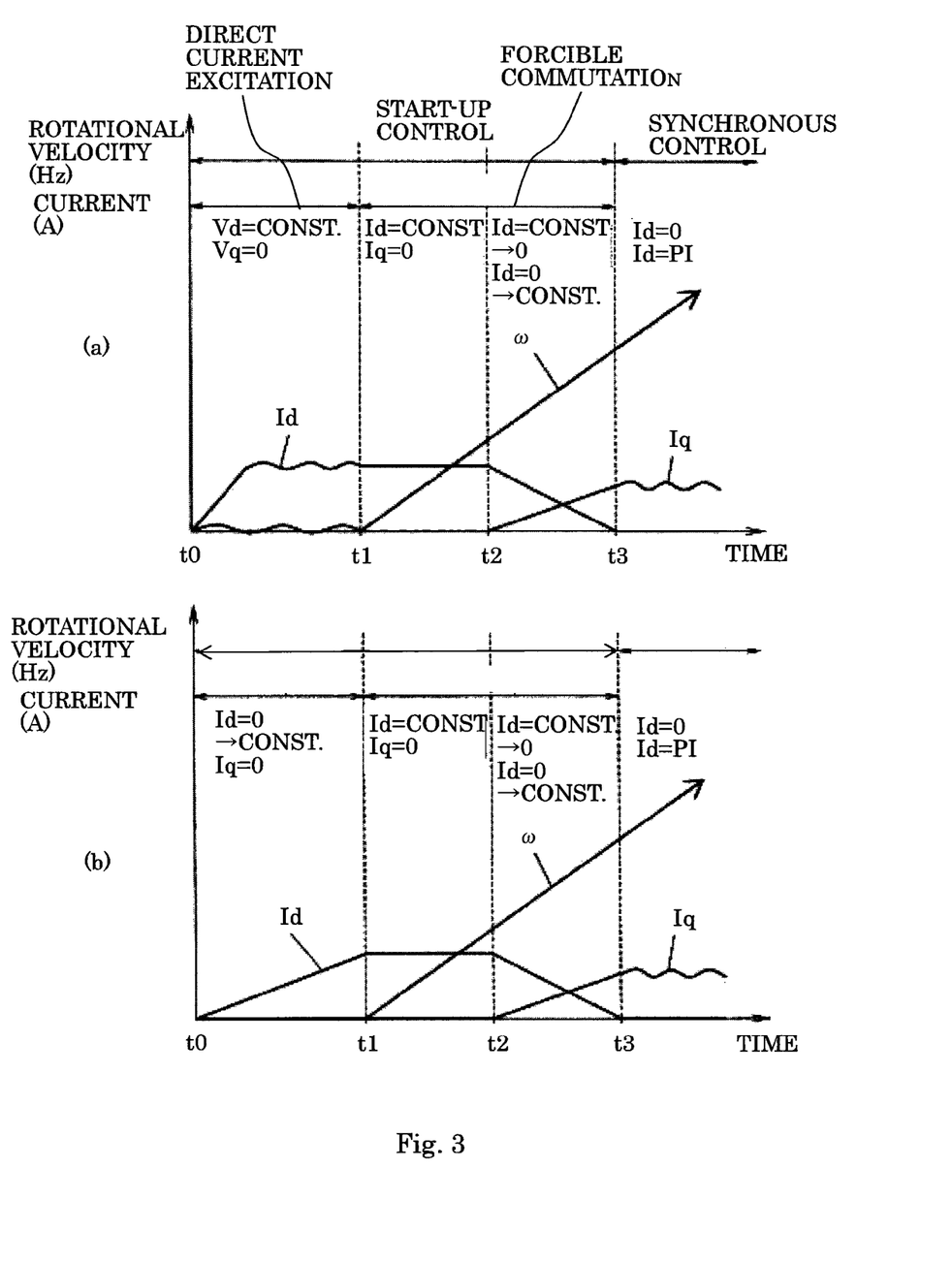
FIG. 3(a) illustrates a d-axis current, a q-axis current and a rotational velocity during a start-up control in the first embodiment.
FIG. 3(b) illustrates a d-axis current, a q-axis current and a rotational velocity during a start-up control in a conventional embodiment.
Figure 4:
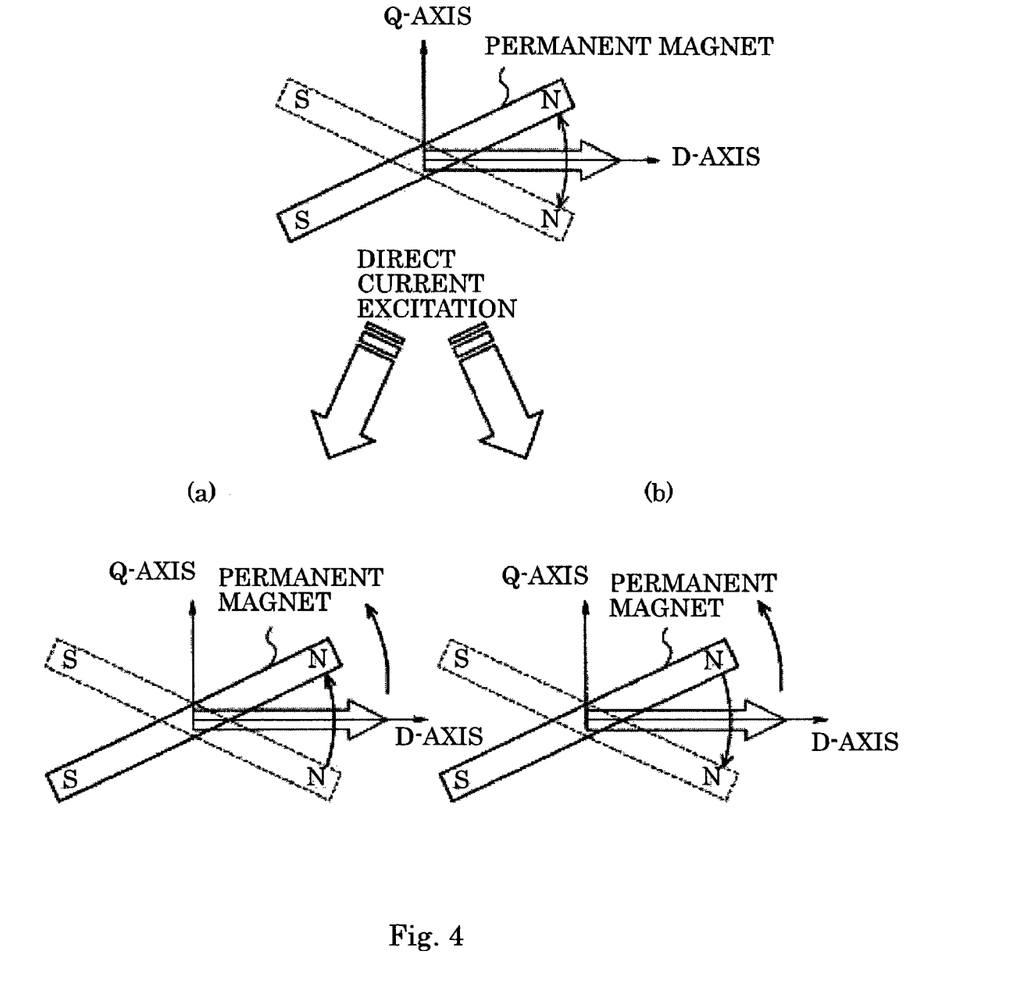
FIG. 4 illustrates a principle of a conversion into a forcible commutation.
Figure 5:
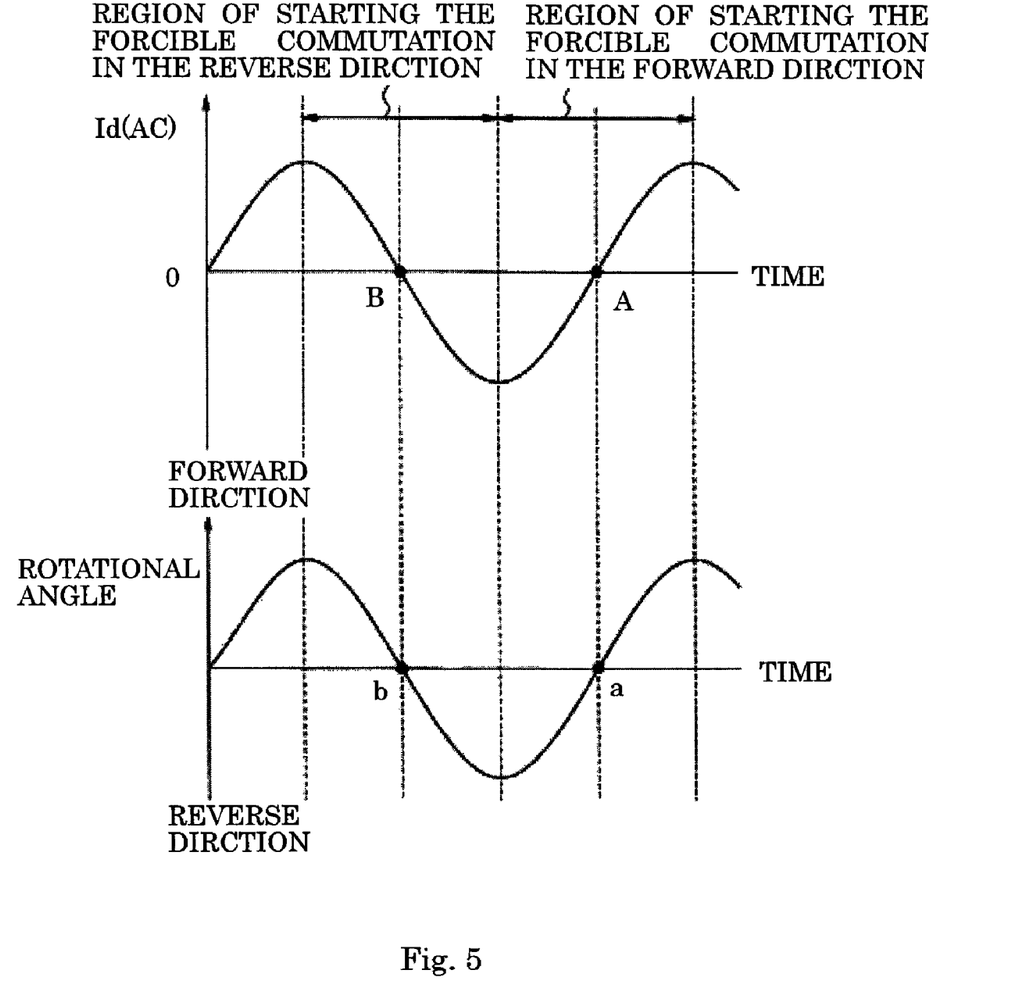
FIG. 5 illustrates a relation between d-axis current and a rotational angle of a fan during a direct current excitation.

Next, the operation of the present embodiment will be described with reference to FIGS. 3 to 5. FIG. 3(a) illustrates a d-axis current, a q-axis current and a rotational velocity during a start-up control in the first embodiment, and FIG. 3(b) illustrates a d-axis current, a q-axis current and a rotational velocity during a start-up control in a conventional embodiment. The start-up controller 38 positions the rotor 13r at a proper position (time t0~t1). Then the start-up controller 38 starts a forcible commutation to the coil wounds 13u, 13v, 13w so as to accelerate the rotor 13r following a proper acceleration pattern (time t1~t3).

The latter time (time t2~t3) of the forcible commutation is the preparation time to change from start-up control to synchronous control. The start-up controller 38 changes to synchronous control based on the rotational position θ estimated by the position estimator 20 when the rotational velocity ω reaches a changing velocity (time t3), and starts velocity feedback control based on the command rotational velocity ωref and the rotational velocity ω estimated by the position estimator 20. The time of direct current excitation in the conventional start-up control is longer than in the present start-up control. The preparation time may be omitted.

Next, the start-up control will be described.

The start-up controller 38 specifies the command d-axis voltage Vd at the constant value, not zero, by switching the switch 26 to a command value side and the command q-axis voltage Vq at zero by switching the switch 27 to zero side, during the direct current excitation. At the point, the start-up controller 38 specifies the rotational position θ (for example θ0) inputted into the rotational coordinate transformers 19, 33 at zero. Then, the rotor 13r rotates toward the rotational position θ0 (for example the position that N pole faces to d-axis). However the rotor 13r passes at the rotational position θ0 (the so-called overshoot) and generates an oscillation that a center of the oscillation is the rotational position θ0 because the fan motor 13 is connected to the big fan 12 that moment of inertia is large.

Figure 6:
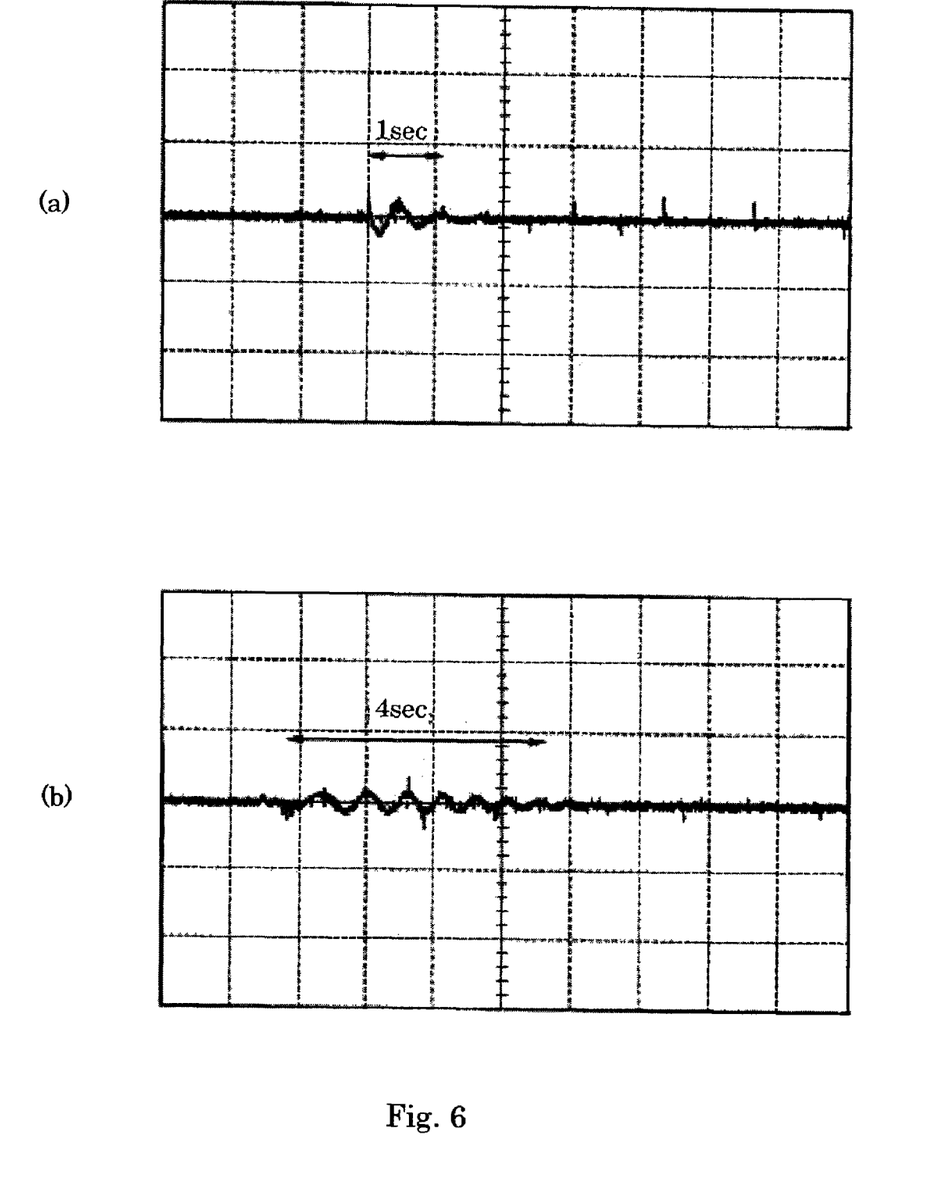
FIG. 6(a) illustrates an output waveform of an acceleration sensor in the second embodiment.
FIG. 6(b) illustrates an output waveform of an acceleration sensor in the conventional embodiment.

In the conventional direct current excitation illustrated in FIG. 3(b), it is difficult to generate the braking torque to oscillation because the d-axis current which is an excitation current component increases from zero to a command value by constant proportion and the q-axis current which is a torque current component is specified at zero. In the present embodiment, the command d-axis voltage Vd is specified at the constant value and the command q-axis voltage Vq at zero. Then the time of convergence of the oscillation in the present embodiment is shorter than in the convention because a braking action arises by the q-axis current in the direction of generating the braking torque (FIG. 6).

In addition, the start-up controller 38 switches to the forcible commutation without waiting the rotor 13r stopping at the rotational position θ0 in order to shorten start-up time. FIG. 4 illustrates a principle of a conversion into a forcible commutation. N pole of the rotational position θ0 corresponds to the direction of d-axis. The permanent magnet in FIG. 4 shows the permanent magnet 13m of the rotor 13r typically. In FIG. 4(a), the rotor 13r starts good by switching to the forcible commutation when the velocity direction of the oscillation of the permanent magnet corresponds with the rotational direction of the forcible commutation. In FIG. 4(b), the rotor 13r starts wrong by switching to the forcible commutation when the velocity direction of the oscillation of the permanent magnet doesn't correspond with the rotational direction of the forcible commutation.

Therefore the start-up controller 38 eliminates the direct d-axis current component Id(DC) of the d-axis current Id by DC filter and detects the oscillation of the rotor 13r based on the alteration of the alternating d-axis current component Id(AC). FIG. 5 illustrates a relation between the alternating d-axis current component Id(AC) and a rotational angle of a fan during a direct current excitation. There is a specific phase relationship between the alternating d-axis current component Id(AC) and the rotational angle of the fan 12 because a current flows in the coil wounds 13u, 13v, 13w by generating the induced voltage during the rotation of the fan 12. The alternating d-axis current component Id(AC) increases when the fan 12 rotates in the forward direction. The alternating d-axis current component Id(AC) decreases when the fan 12 rotates in the reverse direction. Therefore the relation between the alternating d-axis current component Id(AC) and the fan 12 is same phase.

So, in the case of starting in the forward direction, the start-up controller 38 switches from the direct current excitation to the forcible commutation when the ratio of change of the alternating d-axis current component Id(AC) is positive. The start-up controller 38 can start acceleration in the forward direction in the state that the velocity direction of the oscillation of the fan 12 corresponds with the forward direction. Preferably the start-up controller 38 switches from the direct current excitation to the forcible commutation at "A" point that the alternating d-axis current component Id(AC) changes from negative value to positive value because the rotational velocity ω of the fan 12 is maximum at "a" point in FIG. 5. In the case of starting in the reverse direction, the start-up controller 38 switches from the direct current excitation to the forcible commutation when the ratio of change of the alternating d-axis current component Id(AC) is negative. Preferably the start-up controller 38 switches at "B" point that the alternating d-axis current component Id(AC) changes from positive value to negative value.

The start-up controller 38 switches the switches 26 and 27 to the side of PID controllers 31 and 32 respectively when switching to the forcible commutation (time t1 in FIG. 3). The start-up controller 38 switches the switch 24 to the side of a command value and specifies the command d-axis current Idref at the d-axis current in a direct-current excitation end time t1. The start-up controller 38 switches the switch 25 to the side of a command value and specifies the command q-axis current Iqref at zero. Then the rotational velocity ω increases by following an acceleration pattern In the preparation time (time t2~t3) of the latter time of the forcible commutation, the start-up controller 38 decreases the command d-axis current Idref to zero by constant proportion and increase the command q-axis current Iqref to the value of the d-axis current at the end of the preparation time. The start-up controller 38 switches to synchronous control by switching the switches 24 and 25 to the side of zero and the side of the PID controller 23 respectively when the command d-axis current Idref reaches to zero and the command q-axis current Iqref reaches to the value of the d-axis current at the end of the preparation time.

According to the above-described embodiment, starting failure decreases because the start-up controller detects the oscillation of the rotor 13r during the direct current excitation and starts the forcible commutation when the velocity direction of the oscillation corresponds with the rotational direction of the forcible commutation. In the convention, the start-up controller needs to maintain the direct current excitation until the oscillation of the rotor 13r converges. In the present embodiment, the start-up controller switches to the forcible commutation without waiting at the convergence of the rotor 13r, so the starting time in the present embodiment is shorter than in the convention. Especially, the effect of the present embodiment is large in the fan 12 which blows to the exterior heat exchanger 6, because the moment of inertia is large or the torque of the wind also influences.

The braking time to stop at the rotational position is short because the braking torque according to the oscillation of the rotor 13r is generated by maintaining the d-axis voltage Vd at the constant value in the period of the direct current excitation.

Additional elements, such as an acceleration sensor, are unnecessary because the start-up controller 38 specifies the velocity direction of the oscillation of the rotor 13r according to the ratio of change of the d-axis current. The start-up controller starts the forcible commutation at the time that the alternating d-axis current component Id(AC) changes from the negative value to the positive value in the case of forward rotation or from the positive value to the negative value in the case of reverse rotation. So the rotor 13r can be certainly put into operation because the rotor 13r starts acceleration when the rotor 13r rotates at biggest speed in the direction concerned.

Next, the second embodiment in accordance with the invention will be explained with reference to FIG. 6. In the second embodiment, an acceleration sensor is attached to the outside of the fan 12 by fixed metal. The acceleration sensor detects the rotational acceleration of the fan 12. In the case of the direct current excitation that the start-up controller of the motor control unit specifies the command d-axis voltage Vd at the constant value, not zero, and the command q-axis voltage Vq at zero, the start-up controller specifies the rotational direction of the fan 12 based on the rotational acceleration detected by the acceleration sensor. According to the second embodiment like the first embodiment, the rotor 13r can be certainly put into operation and the starting time in the present embodiment is shorter than in the convention.

FIG. 6(a) illustrates an output waveform of an acceleration sensor in the second embodiment in the case of the continuity of the direct current excitation, and FIG. 6(b) illustrates an output waveform of an acceleration sensor in the conventional embodiment in the case of the continuity of the direct current excitation. In FIG. 6(a), the start-up controller specifies the command d-axis voltage Vd at the constant value and the command q-axis voltage Vq at zero. In FIG. 6(b), the start-up controller specifies the command d-axis current Id at the constant value and to command q-axis current Iq at zero. The oscillation of the rotor converges in one second approximately in the case of the present embodiment. The oscillation of the rotor converges in four seconds approximately in the case of convention. It was confirmed by an experiment that the convergence of the oscillation in the convention requires the 4 times as many time as in the present embodiment.

According to the first embodiment and the second embodiment, the braking time to stop at the determined rotational position is short because the braking action of the rotor 13 is generated during the direct current excitation.

The foregoing embodiments are not restrictive, and the following deformation or expansion is possible.

The equations calculated by the position estimator 20 should not be limited to the above-described equations (1)~(6). The equations may be the other equations to be able to estimate the rotational position of the rotor 13r based on the induced voltage of the fan motor 13.

The start-up controller 38 may eliminate the direct component of the q-axis current Iq by the DC filter 37 and detect the oscillation of the rotor 13r based on the alternation of the alternating q-axis current component Iq(AC).

The motor control unit 14 should not be limited to the motor of the fan. The motor control unit 14 can be widely applied to the permanent magnet motor. Especially the motor control unit 14 is suitable for a motor that it is hard for the rotor to stop at the determined rotational position even if the direct current excitation is performed at the time of starting, for example the motor that the moment of inertia is large or the external force like wind affects.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims

What is claimed is:

1. A motor control unit for controlling a permanent magnet motor having a rotor provided with a permanent magnet, comprising:
   a current detector that detects a coil wound current of the permanent magnet motor;
   a coordinate transformer that transforms the coil wound current detected by the current detector into a d-axis current indicating a magnet flux component and a q-axis current indicating a torque component perpendicular to the magnet flux component;
   a position estimator that estimates a rotational position of the rotor based on an induced voltage of the permanent magnet motor;
   a current controller that calculates a command d-axis voltage based on a command d-axis current and the d-axis current detected by the current detector, and that calculates a command q-axis voltage based on a command q-axis current and the q-axis current detected by the current detector;
   an electrifier controller that electrifies the coil wound based on the command d-axis voltage and the command q-axis voltage; and
   a start-up controller that detects an oscillation of the rotor during a start-up operation and, if a velocity direction of the oscillation corresponds with a rotational direction of a forcible commutation, the start-up controller starts the forcible commutation so as to start an acceleration of the rotor by following an acceleration pattern.

2. The motor control unit of claim 1, wherein the start-up controller positions the rotor by maintaining the command q-axis voltage at zero and the command d-axis voltage at a constant value, and detects the oscillation of the rotor based on a change of the d-axis current or the q-axis current.

3. The motor control unit of claim 2, wherein the start-up controller has a filter to eliminate a direct current component of the d-axis current or the q-axis current, and to detect the oscillation of the rotor based on a filtered d-axis current or a filtered q-axis current outputted from the filter.

4. The motor control unit of claim 3, wherein the start-up controller judges the velocity direction of the oscillation of the rotor based on a ratio of a change of the d-axis current or the q-axis current.

5. The motor control unit of claim 3, wherein the start-up controller starts the forcible commutation when the d-axis current or the q-axis current changes from a negative value to a positive value or from a positive value to a negative value.

6. The motor control unit of claim 1, wherein the start-up controller positions the rotor by specifying the command q-axis voltage at zero and the command d-axis voltage at the constant value, and detects the oscillation of the rotor by an acceleration sensor.

7. The motor control unit of claim 1 is a semiconductor integrated circuit device.

8. An air conditioner, comprising:
a exterior heat exchanger that exchanges heat of an exterior air;
a permanent magnet fan motor having a rotor;
a fan linked to the fan motor, the fan for providing a wind flow to the exterior heat exchanger; and
a motor control unit connected to the fan motor so as to drive the fan motor, the motor control unit comprising:
a current detector that detects a coil wound current of the permanent magnet motor;
a coordinate transformer that transforms the coil wound current detected by the current detector into a d-axis current indicating a magnet flux component and a q-axis current indicating a torque component perpendicular to the magnet flux component;
a position estimator that estimates a rotational position of the rotor based on an induced voltage of the permanent magnet motor;
a current controller that calculates a command d-axis voltage based on a command d-axis current and the d-axis current detected by the current detector, and that calculates a command q-axis voltage based on a command q-axis current and the q-axis current detected by the current detector;
an electrifier controller that electrifies the coil wound based on the command d-axis voltage and the command q-axis voltage; and
a start-up controller that detects an oscillation of the rotor during a start-up operation and, if a velocity direction of the oscillation corresponds with a rotational direction of a forcible commutation, the start-up controller starts the forcible commutation so as to start an acceleration of the rotor by following an acceleration pattern.

* * * * *

UNITED STATES PATENT AND TRADEMARK OFFICE
CERTIFICATE OF CORRECTION

PATENT NO. : 8,174,219 B2
APPLICATION NO. : 12/490496
DATED : May 8, 2012
INVENTOR(S) : Oomura Page 1 of 1

It is certified that error appears in the above-identified patent and that said Letters Patent is hereby corrected as shown below:

Claim 8, column 9, line 9, change "a exterior" to --an exterior--.

Signed and Sealed this
Thirty-first Day of July, 2012

David J. Kappos
*Director of the United States Patent and Trademark Office*